United States Patent
Lee et al.

(10) Patent No.: US 10,244,423 B2
(45) Date of Patent: Mar. 26, 2019

(54) CHUNK-BASED SCHEDULING METHOD AND CHUNK-BASED SCHEDULING APPARATUS IN WIRELESS COMMUNICATION SYSTEM

(71) Applicant: Samsung Electronics Co., Ltd., Suwon-si, Gyeonggi-do (KR)

(72) Inventors: Ji-Cheol Lee, Suwon-si (KR); Hyung-Ho Lee, Seoul (KR); Sung-Ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/435,073

(22) PCT Filed: Oct. 11, 2013

(86) PCT No.: PCT/KR2013/009117
§ 371 (c)(1),
(2) Date: Apr. 10, 2015

(87) PCT Pub. No.: WO2014/058277
PCT Pub. Date: Apr. 17, 2014

(65) Prior Publication Data
US 2015/0271700 A1    Sep. 24, 2015

(30) Foreign Application Priority Data

Oct. 11, 2012 (KR) .......................... 10-2012-0113073

(51) Int. Cl.
*G01R 31/08* (2006.01)
*H04W 28/02* (2009.01)
(Continued)

(52) U.S. Cl.
CPC .... *H04W 28/0263* (2013.01); *H04W 72/0413* (2013.01); *H04W 72/1236* (2013.01);
(Continued)

(58) Field of Classification Search
USPC ........................................................ 370/230
See application file for complete search history.

(56) References Cited

U.S. PATENT DOCUMENTS

2003/0108059 A1    6/2003  Yew et al.
2004/0160922 A1    8/2004  Nanda et al.
(Continued)

FOREIGN PATENT DOCUMENTS

KR    10-2004-0052480 A    6/2004
KR    10-2005-0098944 A    10/2005
(Continued)

OTHER PUBLICATIONS

Korean Office Action dated Dec. 21, 2018, issued in Korean Application No. 10-2012-0113073.

*Primary Examiner* — Phuongchau Ba Nguyen
(74) *Attorney, Agent, or Firm* — Jefferson IP Law, LLP (57) ABSTRACT

A chunk-based scheduling method and a chunk-based scheduling apparatus, capable of improving Quality of Service (QoS) upon the occurrence of congestion in a wireless communication system are provided. The method includes requesting, by a terminal, from a base station for chunk-based scheduling which uses an available bit rate bearer so as to receive chunk that constitutes traffic, and receiving, from the base station, at least one chunk scheduled based on the time limit information of the chunk.

16 Claims, 5 Drawing Sheets

(51) Int. Cl.
*H04W 72/12* (2009.01)
*H04W 72/04* (2009.01)

(52) U.S. Cl.
CPC ... *H04W 72/1257* (2013.01); *H04W 72/1284* (2013.01); *H04W 28/0257* (2013.01); *H04W 28/0289* (2013.01)

(56) References Cited

U.S. PATENT DOCUMENTS

| | | | |
|---|---|---|---|
| 2009/0225463 A1* | 9/2009 | Itoh | G11B 19/042 360/55 |
| 2010/0111004 A1* | 5/2010 | Yi | H04L 12/5695 370/329 |
| 2010/0142915 A1 | 6/2010 | McDermott et al. | |
| 2011/0075744 A1 | 3/2011 | Laselva et al. | |
| 2011/0158182 A1 | 6/2011 | Biton et al. | |
| 2011/0167170 A1 | 7/2011 | Kovvali et al. | |
| 2011/0314130 A1 | 12/2011 | Strasman | |
| 2012/0100864 A1 | 4/2012 | Susitaival et al. | |
| 2013/0332620 A1* | 12/2013 | Gahm | H04N 21/23805 709/231 |
| 2014/0013376 A1* | 1/2014 | Xu | H04N 21/25 725/116 |
| 2014/0219230 A1 | 8/2014 | Schierl et al. | |

FOREIGN PATENT DOCUMENTS

| | | |
|---|---|---|
| KR | 10-2010-0062812 A | 6/2010 |
| KR | 10-2011-0030506 A | 3/2011 |
| WO | 2011/002386 A1 | 1/2011 |
| WO | 2013/057315 A2 | 4/2013 |

* cited by examiner

CHUNK-BASED SCHEDULING METHOD AND CHUNK-BASED SCHEDULING APPARATUS IN WIRELESS COMMUNICATION SYSTEM

CROSS-REFERENCE TO RELATED APPLICATION(S)

This application is a U.S. National Stage application under 35 U.S.C. § 371 of an International application filed on Oct. 11, 2013 and assigned application number PCT/KR/2013/009117, which claims the benefit of a Korean patent application filed on Oct. 11, 2012 in the Korean Intellectual Property Office and assigned Serial number 10-2012-0113073, the entire disclosure of which is hereby incorporated by reference.

TECHNICAL FIELD

The present disclosure relates to a method and an apparatus for a scheduling in a wireless communication system. More particularly, the present disclosure relates to a method and an apparatus for a scheduling which considers Quality of Service (QoS) when network congestion occurs.

BACKGROUND

It is known that bulk traffic, such as video data, statistically makes up 70% of all traffic in a wireless communication system. In a wireless communication system, a user experiences network congestion due to a sudden increase of traffic. For effective transmission of traffic considering the network congestion, various adaptive streaming methods are being proposed.

The adaptive streaming methods includes, for example, the 3rd Generation Partnership Project (3GPP), the Hyper Text Transfer Protocol (HTTP) live streaming proposed by Apple, a smooth streaming method proposed by MS, and the like.

The adaptive streaming method adjusts a bit rate of streaming according to a change of a network process amount, and thus, there are advantages in which a streaming service without an interruption may be provided to a user and a practicable best reception quality may be provided. In a wireless communication system using the adaptive streaming method a Guaranteed Bit Rate (GBR) bearer and a non-GBR bearer are provided according to traffic characteristics. However, most traffic is transmitted using the non GBR bearer.

However, in the existing adaptive streaming method, a connection between a network operator and a contents operator is difficult, and it is difficult to distinguish the type of traffic as well as the start and end of a media stream. Especially, when the media file is transmitted using a Contents Delivery Network (CDN), it is difficult to identify traffic due to a changed Internet Protocol (IP) address.

A concept of a bearer transferring a video traffic in a 3GPP Evolved Packet System (EPS) is schematically described in the below.

In the 3GPP EPS, there are two types of bearers the GBR bearer and the non-GBR bearer. In addition, the bearers are related to Quality of Service (QoS) parameters, such as a Quality Class Identifier (QCI), and an Allocation and Retention Priority (ARP). In addition, the GBR bearer is additionally related to a bit rate parameter, such as a (GBR) and a Maximum Bit Rate (MBR).

In the 3GPP EPS, the non-GBR bearer does not have bit rate parameters of a bearer level. In contrast, the non-GBR bearer uses a method of executing all non-GBR bearers using an Aggregate Maximum Bit Rate (AMBR) and two different AMBR parameters (e.g., an Access Point Name-AMBR (APN-AMBR) defined per subscriber and UE-AMBR).

In addition, the QCI of the bearers are described. The QCI is mapped by a network node to access node specific parameters controlling a bearer level packet transmission process. The node specific parameter, for example, may include scheduling weights, admission thresholds, queue management thresholds, a link layer protocol configuration, and the like. Definitions of each parameter may refer to a publicly known concerning standard of the 3GPP EPS.

Meanwhile, in the 3GPP EPS, for example, nine QCIs are made as a standard, and service providers may define additional QCIs.

Meanwhile, as described above, when a packet is leaked by the network congestion in a Radio Access Network (RAN) of the wireless communication system using the non-GBR bearer, a user equipment cannot distinguish between a traffic of a video traffic and a traffic of a normal download data according to the use of the non-GBR bearer.

As described above, when a packet is leaked by the network congestion, a Transmission Control Protocol (TCP) re-transmission of the leaked packet is performed, when a user equipment receives a video traffic, the user equipment may not receive the leaked packet in a time limit for a service without an interruption. In addition, when lower bandwidth is allocated, it is difficult for the re-transmission packet to be transmitted in the time limit.

Therefore, a need exists for a method and an apparatus for a chunk-based scheduling which can improve QoS when congestion occurs in a wireless communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for a chunk-based scheduling which can improve Quality of Service (QoS) when congestion occurs in a wireless communication system.

In accordance with an aspect of the present disclosure, a method of scheduling performed in a wireless communication system is provided. The method includes requesting a chunk-based scheduling based on an available bit rate bearer to an evolved Node B (eNB) in order to receive a chunk constituting a traffic, and receiving at least one chunk scheduled based on time limit information of the chunk from the eNB.

In accordance with another aspect of the present disclosure, a user equipment in a wireless communication system is provided. The user equipment includes a transmitting and receiving unit configured to transmit and receive data to and from an eNB through a wireless network, and a control unit configured to request a chunk-based scheduling based on an available bit rate bearer to the eNB in order to receive a chunk constituting traffic, and to receive at least one chunk scheduled based on time limit information of the chunk from the eNB.

In accordance with another aspect of the present disclosure, a method of scheduling performed in a wireless communication system is provided. The method includes receiving, from a user equipment, a chunk-based scheduling based on an available bit rate bearer for transmitting a chunk constituting a traffic, and scheduling the transmission of at least one chunk to be transmitted to the user equipment based on time limit information of the chunk.

In accordance with to another aspect of the present disclosure, an eNB in a wireless communication system is provided. The eNB includes a transmitting and receiving unit configured to transmit and receive data to and from a user equipment through a wireless network, and a control unit configured to receive, from the user equipment, a chunk-based scheduling request based on an available bit rate bearer for a transmission of a chunk constituting a traffic, and to schedule at least one chunk transmitted to the user equipment based on time limit information of the chunk.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A method of scheduling according to an embodiment of the present disclosure to be described below is proposed such that a service without any interruption may be provided to a user. The method of scheduling according to an embodiment of the present disclosure distinguishes a packet which may influence a user Quality of Service (QoS) (or Quality of Experience (QoE) and a packet which does not influence the user QoS (or QoE) when congestion occurs in a network. In the method, the packet which may influence the QoS is first transferred to a user equipment, and thus the QoS is guaranteed in a wireless communication system using limited resources.

Embodiments of the present disclosure may be more effectively applied to a real time service of large capacity traffic, such as a case in which a streaming service of video traffic is provided. Hereinafter, in the present specification, traffic refers to as a video traffic, and the like, provided through a streaming service, if there is not a special reference.

In an adaptive streaming method, such as a Hyper Text Transfer Protocol (HTTP) adaptive streaming method, traffic is divided into a chunk, which is a short time unit, and is transferred through a network.

In an embodiment of the present disclosure, an evolved Node B (eNB) schedules chunks of the traffic based on a deadline such that the chunks of the traffic is transmitted in a time limit for a real time service without interruption. Here, the deadline refers to a playing time of the chunk. For example, the deadline may be defined to the playing time of the chunk such that a user equipment (UE) can receive the next chunk while one chunk is played. In addition, if an interruption does not occur when successive chunks are played, various time limits in addition to the playing time of the chunk may be configured as the deadline. In an embodiment of the present disclosure, a user equipment may provide, to an eNB, at least one scheduling parameter necessary for performing a chunk-based scheduling by the eNB.

Figure 1:
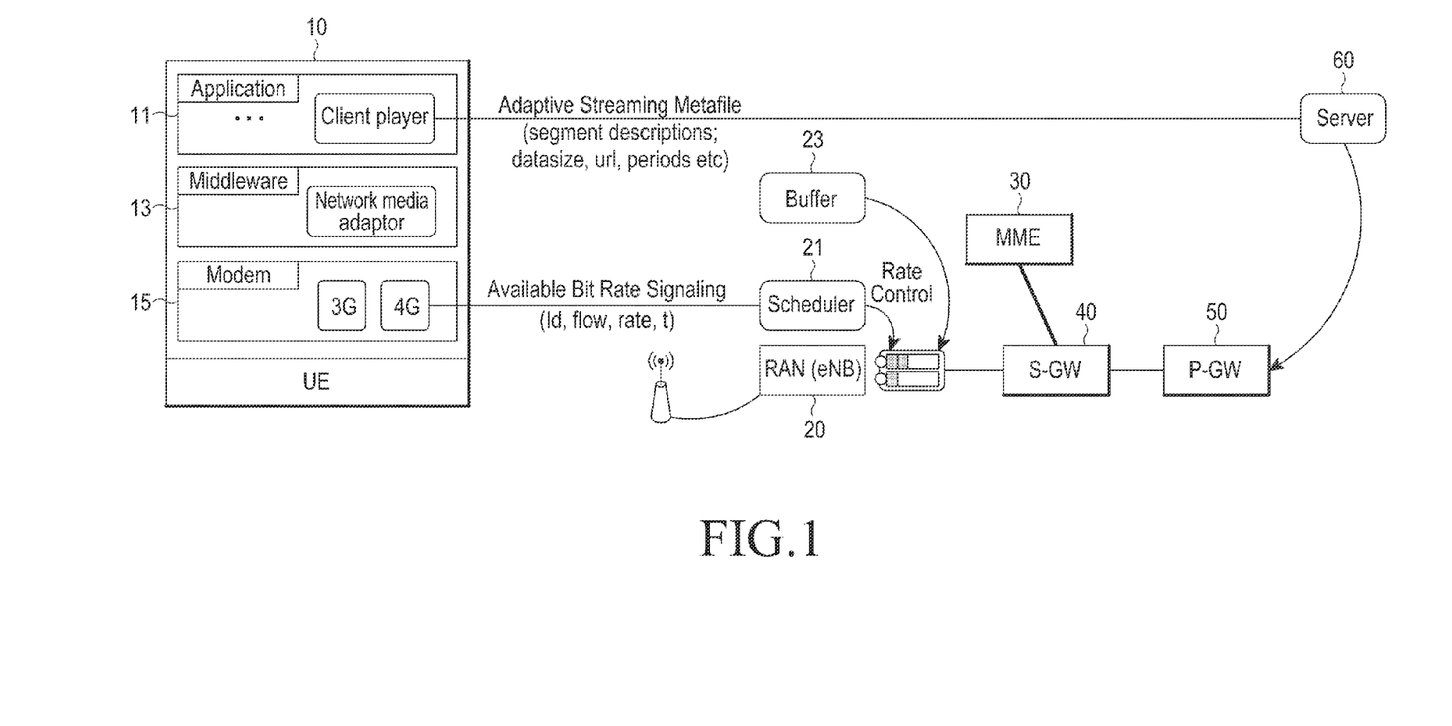
FIG. 1 is a block diagram illustrating a configuration of a wireless communication system performing a chunk-based scheduling according to an embodiment of the present disclosure.

FIG. 1 is a block diagram illustrating a configuration of a wireless communication system performing a chunk-based scheduling according to an embodiment of the present disclosure. The embodiment described below is described through an example of a 3GPP EPS, but a method of scheduling of the present disclosure is not limited to the 3GPP EPS.

Referring to FIG. 1, a UE 10 receives traffic divided in a chunk unit from a server 60 which provides a streaming service, such as a video, and the like, under a chunk-based scheduling of an eNB 20. The UE 10 includes a client player 11 which is an application for a playing a video, and the like, provided through a streaming service, a middleware 13 (e.g., using a network media adaptor, and the like) connecting the client player 11 and a non-shown platform of the UE 10, a modem 15 processing encoding/decoding of data transmitted and received through a wireless network, a transmitting unit and a receiving unit (not shown) for data transmission and reception through the wireless network. In the UE, other elements except for the transmitting unit and the receiving unit may be implemented in a control unit.

Referring to FIG. 1, the eNB 20 constitutes a Radio Access Network in a wireless communication system, and includes a scheduler 21, and a buffer (e.g., a streaming cache 23) which buffers traffic data provided to the UE 10 through a streaming service. In addition, although not shown, the eNB 20 includes a transmitting unit and a receiving unit for transmitting and receiving data through a wireless network, and a communication interface for communication with other network entities. The scheduler 21 may be implemented in a control unit (not shown) which generally controls an operation of the eNB 10, and other elements except for the transmitting unit and the receiving unit may be implemented in the control unit. In addition, the scheduler 21 distinguishes a chunk of a traffic which may influences a QoS of a streaming service and a chunk of a traffic which does not influence the QoS, and schedules allocation of resources such that the chunk which may influences the QoS is transferred to the UE 10 in a deadline.

Referring to FIG. 1, a Mobility Management Entity (MME) 30 is a network entity for managing mobility, a position registration, and the like of the UE 20. The MME 30 is in charge of a control plane for a control information change between the UE 10 and a system, and a Serving Gateway (S-GW) 40 and a PDN Gateway (P-GW) 50 are in charge of a user plane for a user data transmission. Here, the S-GW 40 is concerned with a configuration of a bearer for a data transmission, and configures or disconnects the bearer under a control of the MME 30. In addition, although not shown, a Policy Control and charging Rules Function (PCRF) controls a policy related to a QoS and a billing. The P-GW 50 transfers, to the S-GW 40, parameters required to configure an Available Bit Rate (ABR) bearer supporting the chunk-based scheduling according to an embodiment of the present disclosure, according to the policy of the PCRF.

Referring to FIG. 1, the server 60 is a streaming server of an operator which provides a streaming service, such as a video, to the UE 10. For example, the server 60 may receive an HTTP request from the client player 11 of the UE 10 to use an HTTP server, and the like, which transmits a chunk to the UE 10. In addition, referring to FIG. 1, it is illustrated that the media file of the streaming service, which is the traffic data divided in the chunk unit is directly transmitted to the UE 10, but it is conceptually illustrated for convenience of understanding, real traffic data is transmitted to the UE 10 through the eNB 20 and a wireless network.

Hereinafter, a procedure of configuring an ABR bearer according to an embodiment of the present disclosure is described.

Figure 2:
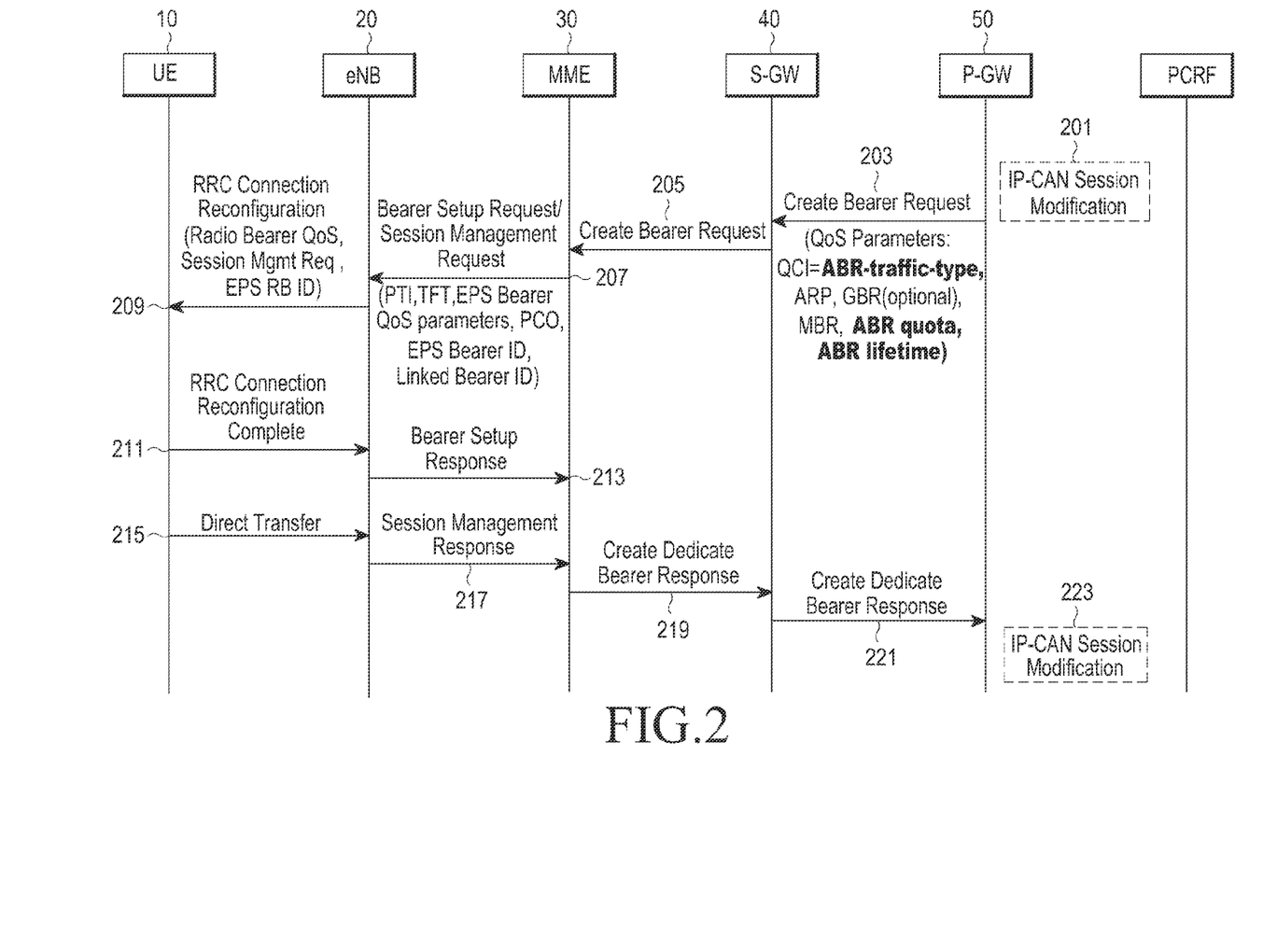
FIG. 2 is a flowchart illustrating a process of configuring an Available Bit Rate (ABR) bearer supporting a chunk-based scheduling according to an embodiment of the present disclosure.

FIG. 2 is a flowchart illustrating a process of configuring an ABR bearer supporting a chunk-based scheduling according to an embodiment of the present disclosure.

Referring to FIG. 2, in operations 201 to 223, remaining operations except for operation 203 are the same as an operation of configuring a non-GBR default bearer regulated in the existing 3GPP EPS.

The ABR bearer is QoS parameters proposed as shown in Table 1 below when the non-GBR default bearer is configured. In operation 203, the ABR parameters according to the present embodiment may be included and configured in a bearer generation request (i.e., create bearer request) message transferred from the P-GW 50 to the S-GW 40.

In operation 205, the S-GW 40 receiving the create bearer request message additionally including the ABR parameters transfers the create bearer request message to the MME 205.

In addition, in operation 207, the ABR parameters are transferred to the UE 10 through the eNB 20.

The ABR parameters includes at least one of an ABR capability indicator indicating whether the bearer to be configured supports the chunk-based scheduling, an exclusive QCI index of the ABR bearer newly allocated to indicate characteristics (e.g., an ABR-traffic-type) of the traffic transmitted through the ABR bearer, a lifetime of the ABR bearer, and a data quota of which a transmission is scheduled through the ABR bearer (e.g., the number of bytes, the number of transmission blocks, and the like).

Thereafter, in operation 209 and operation 211, after a Radio Resource Control (RRC) configuration process between the UE 10 and the eNB 20 is finished, in operation 219, the S-GW 40 receiving a bearer generation response (i.e., create dedicated bearer request) message from the MME 20 configures the ABR bearer using the ABR parameters. Operations 213, 215, 217, 221, and 223, which are not described with reference to FIG. 2 are the same as the configuration operation of an exclusive bearer (i.e., dedicated bearer) in the existing 3GPP EPS. The process of activating the dedicated bearer may refer to 3GPP TS23.401 Section 5.4.1 Dedicated Bearer activation. Thus, related detailed descriptions will be omitted.

TABLE 1

| ABR parameter | Unit | Description |
| --- | --- | --- |
| ABR quota | Octets | Remaining number of bytes to be transmitted via ABR bearer |
| ABR lifetime | miliseconds | Remaining lifetime of the ABR bearer activation |
| Dedicated QCI | QCI index | Newly allocated index for indicating available bit rate traffic characteristics |
| ABR Capability Indicator | 1 bit indicator | Indicate whether the current bearer supports chunk based scheduling |

Figure 3:
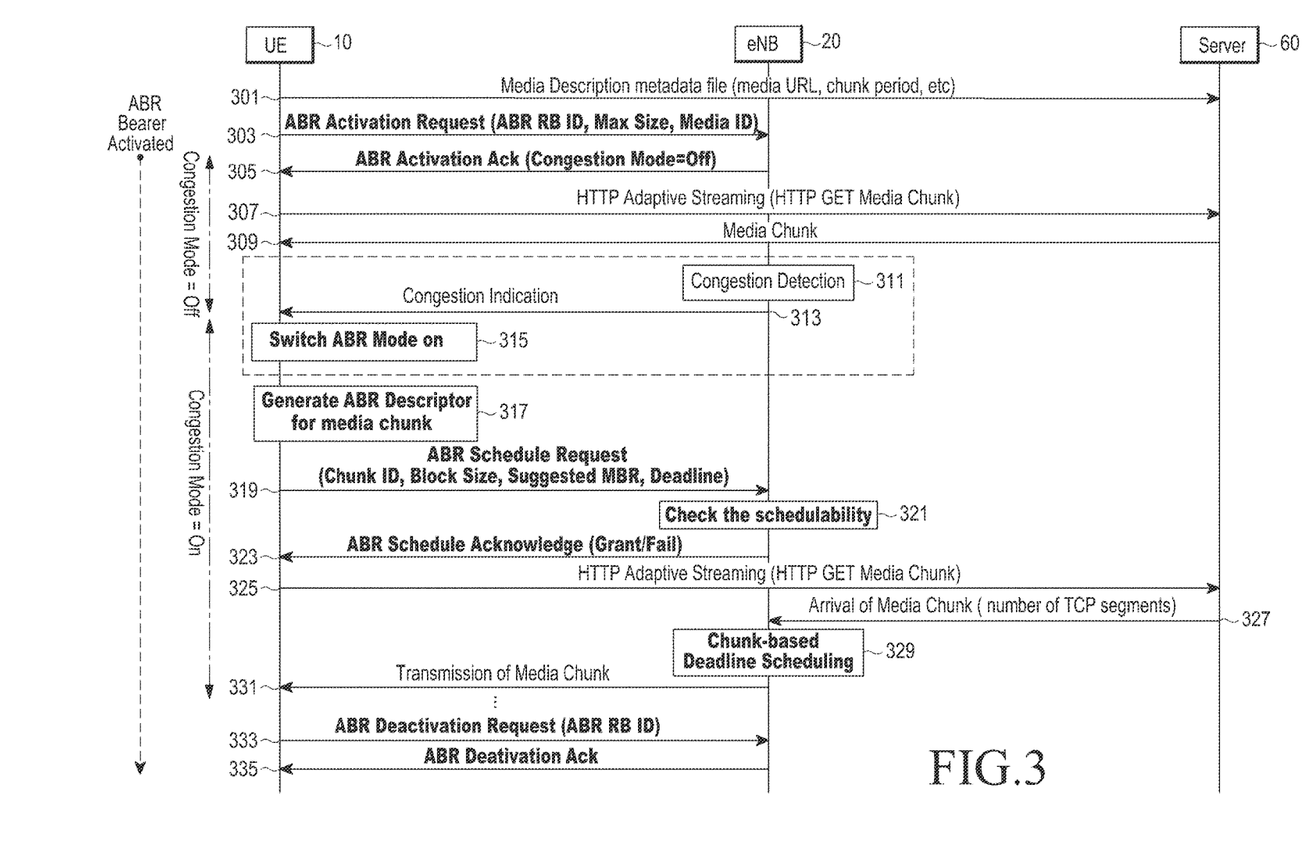
FIG. 3 is a flowchart illustrating a process of a chunk-based scheduling using an ABR bearer configured according to an embodiment of the present disclosure.

FIG. 3 is a flowchart illustrating a process of a chunk-based scheduling using an ABR bearer configured according to an embodiment of the present disclosure. The process of FIG. 3 is performed in an assumption that the UE 10 already receives the ABR parameters from a network according to the process of FIG. 2.

Referring to FIG. 3, an operation of the UE 10 which receives the traffic data by the streaming service from the server 60 according to the chunk-based scheduling process using the ABR bearer according to the embodiment of FIG. 3 is described. The UE 10 receives a metadata file for the chunk from the server 60. Here, the metadata file, may be understood as a concept similar to a multimedia presentation descriptor in a DASH. When the UE 10 receiving the metadata file receives control information indicating an occurrence of congestion in a network from the eNB 20, the UE 10 executes an ABR mode for receiving the traffic through the chunk-based scheduling. Thereafter, the UE 10 executing the ABR mode transmits, to the eNB 20, information (e.g., a chunk identifier, a chunk size, a deadline, and the like) for the next chunk to be received next to the currently received chunk to request the chunk-based scheduling to the eNB 20. Then, the eNB 20 performs a scheduling such that the chunks to be transmitted to a corresponding to UE 10 are transmitted to the UE 10 based on the deadline.

FIG. 3 is a flowchart illustrating a process of a chunk-based scheduling according to an embodiment of the present disclosure. Referring to FIG. 3, the portions displayed in bold illustrate characteristic proposed in the embodiment of the present disclosure.

In operation 301 of FIG. 3, the UE 10 receives and stores a metadata file including media description information which includes a media chunk Uniform Resource Locator (URL) and a playing time of the chunk (i.e., chunk period, that is chunk deadline) for downloading the chunk from the server 60. In operation 303, the UE 10 transmits an ABR activation request message for activating the ABR bearer to the eNB 20. The ABR activation request message is a message requesting a start of a performance of the chunk-based scheduling to the eNB 20. The ABR activation request message includes at least one of an ABR bearer identifier (i.e., ABR Radio Bearer (RB) ID), a maximum size of the chunk, a media identifier, and traffic filter information (e.g., an IP 5 tuple, a traffic filter template, and the like). The media identifier may be used as the chunk identifier.

In operation 303 of FIG. 3, when the eNB 20 receives the ABR activation request message, the eNB 20 determines whether a channel bandwidth and a buffer allocation for the ABR bearer are possible. When the channel bandwidth and the buffer allocation are possible, in operation 305, the eNB 20 transfers, to the UE 10, an ABR activation acknowledge message which informs an activation of the ABR bearer. The ABR activation acknowledge message may include ABR switch control mode information. For example, the ABR switch control mode information indicates a congestion mode as an off state when a state of a network is not a congestion state, and indicates the congestion mode as an on state when the state of the network is the congestion state, according to whether congestion of the network occurs. Here, even when the congestion mode is the off state, the ABR bearer is activated, but the ABR mode receiving the traffic through the chunk-based scheduling is the off state.

In operation 307, the UE 10 receiving the ABR activation acknowledge message of which the congestion mode is configured in the off state transmits, to the server 60, a request message (e.g., HTTP get media chunk) for receiving the chunk of the streaming service from the server 60. In operation 309, the server 60 starts to transmit the chunk to the UE 10.

Thereafter, while the UE 10 downloads and receives the chunk from the server 60, in operation 311, the eNB 60 determines whether the state of the network enters the congestion state. In operation 313, when the state of the network is determined to be the congestion state, in operation 313, the eNB 60 transmits, to a corresponding UE 10, control information which indicates to switch the ABR mode into an on state. Here, the control information may include information (e.g., a congestion indication) which indicates that a current network is a congestion state.

In operation 313, the congestion indication may be transmitted to the UE 10 through an additional signaling message or may be transmitted to the UE 10 using a non-specified message. Here, for example, the non-specified message may use a broadcast message (i.e., broadcast in SIB message) transferring system information, a unicast RRC message, or an in-band signaling. Here, for example, the broadcast message and the unicast RRC message may include 1 bit of congestion indication bits (i.e., congestion indication 1 bit) as the congestion indication, and the in-band signaling may include an IP ECN bit which indicates a congestion state in an IP Explicit Congestion Notification (ECN) field as the congestion indication.

In addition, in operation 313, the congestion indication indicates a transmission of an ABR schedule request message including the parameters (e.g., the chunk size, the deadline, and the like) necessary in the chunk-based scheduling from the UE 10 to the eNB 20.

In operation 315, the UE 10 receiving the congestion indication switches the ABR mode for the chunk-based scheduling into the on state.

In operation 317, the UE 10 obtains (or generates) ABR scheduling parameters including, for example, the chunk identifier, the chunk size (e.g., the size of a transmission block transmitting the chunk), the deadline, and the like, from the metadata file received from the server 60 in operation 301 and/or the ABR parameters received in operation 209 of FIG. 2. Thus, this process may be understood to a process of generating an ABR descriptor for the ABR bearer.

Thereafter, in operation 319, the UE 10 transmits, to the eNB 20, the ABR schedule request message requesting the chunk-based scheduling using the ABR bearer. At this time, the ABR schedule request message includes at least one of the ABR scheduling parameters and is transmitted. In addition, in the chunk-based scheduling, various pieces of additional information related to a reception of chunk packets may be additionally included in the ABR schedule request message.

In addition, in operation 321, the eNB 20 receiving the ABR schedule request message determines whether the chunk-based scheduling is possible based on whether a download packet (i.e., the chunk packet) of the chunk size requested from the UE 10 is scheduled in the deadline, an available band, previous scheduling information, a channel state of the UE 10, and the like.

In operation 323, the eNB 20 transmits, to the UE 10, the ABR schedule acknowledge message including information (e.g., grant or fail) indicating whether the chunk-based scheduling is possible.

Referring to FIG. 3, when the scheduling is not possible, the eNB 20 inputs a fail code in the ABR schedule acknowledge message, and the eNB 20 may propose a transmission block size or a transmission rate possible in the chunk transmission. In addition, the UE 10 receiving the ABR schedule acknowledge message in which the fail code is included may (re-)select another chunk, or may adjust a transmission rate or a chunk size necessary to transmit the chunk and re-transmit the ABR schedule request message. In addition, for example, the ABR schedule acknowledge message in which the fail code is included may include information on 'no resource available', 'available transmission size is exceeding', or 'available transmission rate'. The embodiment of FIG. 3 assumes that a case in which the chunk-bases scheduling is possible.

Thereafter, in operation 325, the UE 10 receiving the ABR schedule acknowledge message which indicates that the scheduling is possible transmits, to the server 60, the request message (e.g., HTTP get media chunk) for receiving the chunk of the streaming service from the server 60.

In operation 327, the sever 60 starts to transmit the chunk. At this time, in operation 329, when a packet of the chunk arrives through the ABR bearer supporting the chunk-based scheduling, the eNB 20 determines whether the chunk of which the scheduling is requested by the UE 10, and when the chunk is the chunk of which the scheduling is requested, the eNB 20 performs the chunk-based scheduling such that the chunk is transmitted in the time limit (e.g., the period of the chunk) based on the deadline of the corresponding chunk. At this time, the eNB 20 adjusts bandwidths according to a time, which are allocated to each UE within an available bandwidth (i.e., available BW for non-GBR) range based on amounts of the traffic transmitted to each UE, the deadline, and the like, in a situation in which a plurality of UEs performing the scheduling exist.

In operation 331, the scheduled chunks are transmitted to the UE. Therefore, since the chunk may be transmitted to the UE 10 by a certain deadline, the UE 10 can receive the streaming service without interruption, and QoS of the chunk-based streaming service can be guaranteed.

Thereafter, in operation 333, the UE 10 desires to end the chunk-based streaming service or the UE 10 receiving all chunks transmits, to the eNB 20, the ABR deactivation request message requesting the deactivation of the ABR bearer. In operation 335, the eNB 20 performs an operation for deactivating the ABR bearer, and transmits an ABR deactivation response message to the UE 10.

In addition, when the chunk-based scheduling is always performed in the embodiment of FIG. 3, the operations of operations 311 to 315 may be omitted.

Figure 4:
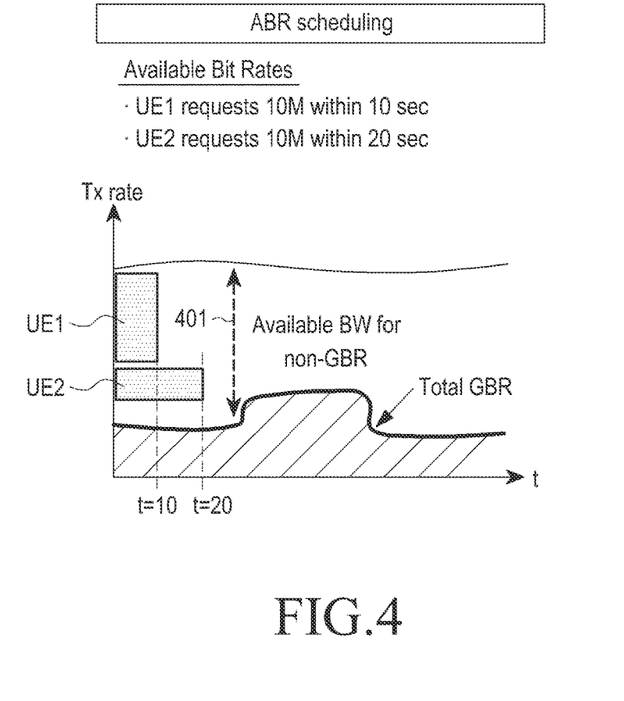
FIG. 4 illustrates an operation of a chunk-based scheduling according to an embodiment of the present disclosure.

FIG. 4 illustrates an operation of a chunk-based scheduling according to an embodiment of the present disclosure.

Referring to FIG. 4, the operation assumes that a case in which two UEs UE1 and UE2 simultaneously request a transmission of a traffic of 10 MByte capacity to an eNB, the transmission to the UE UE1 should be performed in 10 seconds, and a transmission to the UE UE2 should be performed in 20 seconds.

In this case, when the existing method is used, two UEs UE1 and UE2 are equally scheduled, when whole available bandwidth 401 is not allocated, the UE UE1 cannot completely receive 10 MByte traffic in ten seconds, and thus a buffering phenomenon occurs when UE UE1 plays a video. However, when the chunk-based scheduling of the present disclosure is applied, more bandwidth is allocated to the UE UE1 compared to the UE UE2, and thus the UE UE1 may be scheduled with a limited deadline. Even if a comparatively lower bandwidth is allocated to the UE UE2 compared to the UE UE1 during an initial 10 seconds when the UE UE1 is scheduled, since there is a time of 10 seconds in the deadline of 20 seconds, the UE UE2 may be scheduled such that a buffer does not occur in the UE UE2.

Figure 5:
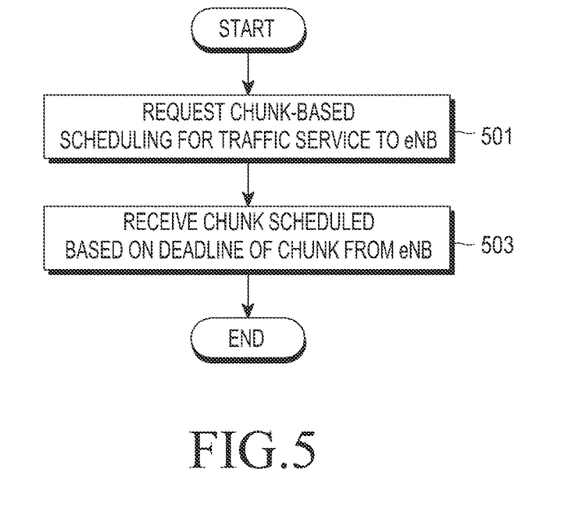
FIG. 5 is a flowchart illustrating an operation of a user equipment (UE) for a chunk-based scheduling according to an embodiment of the present disclosure.

FIG. 5 is a flowchart illustrating an operation of a UE for a chunk-based scheduling according to an embodiment of the present disclosure. FIG. 5 is based on the embodiment of FIG. 3.

Referring to FIG. 5, for example, in operation 501, the UE 10 using the traffic service, such as the streaming service requests, to the eNB 20, the chunk-based scheduling using the available bit rate bearer in order to receive the chunk constituting the traffic.

Thereafter, in operation 503, the UE 10 receives at least one chunk based on the deadline (e.g., time limit information of the chunk) of the chunk from the eNB 20.

Figure 6:
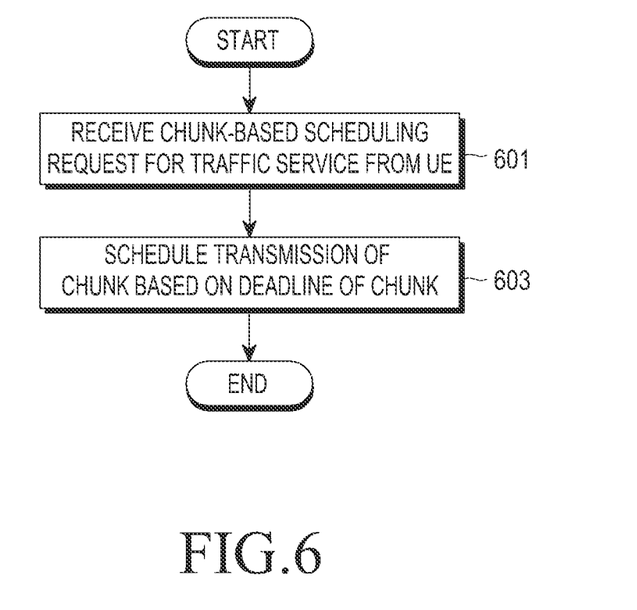
FIG. 6 is a flowchart illustrating an operation of an evolved Node B (eNB) for a chunk-based scheduling according to an embodiment of the present disclosure and FIG. 7 is a block diagram illustrating a device configuration of a UE or an eNB according to an embodiment of the present disclosure.

FIG. 6 is a flowchart illustrating an operation of an eNB for a chunk-based scheduling according to an embodiment of the present disclosure. FIG. 6 is based on the embodiment of FIG. 3.

Referring to FIG. 6, for example, in operation 601, the eNB 20 receives the chunk-based scheduling request using the available bit rate bearer for the transmission of the chunk constituting the traffic from the UE 10 using the traffic service, such as the streaming service.

Thereafter, in operation 603, the eNB 20 schedules at least one chunk to be transmitted to the UE 10 based on the deadline (e.g., time limit information of the chunk) of the chunk.

Figure 7:
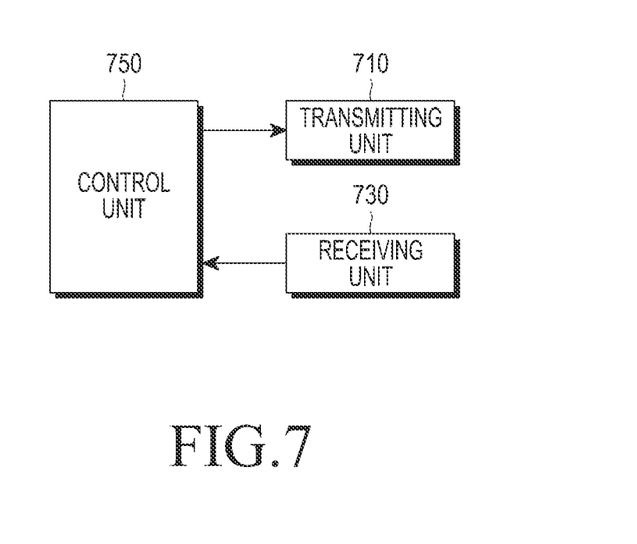

FIG. 7 is a block diagram illustrating a device configuration of a UE or an eNB according to an embodiment of the present disclosure.

Referring to FIG. 7, the device includes a transmitting unit 710 and a receiving unit 730 for transmitting and receiving data through a wireless network, and a control unit 750 controlling an operation for the chunk-based scheduling described with reference to FIGS. 3, 4, 5, and 6. Here, the transmitting unit 710 and the receiving unit 730 may be implemented as a transceiver.

Thus, the UE 10 according to an embodiment of the present disclosure may be implemented by including a transmitting and receiving unit which transmits and receives data to and from the eNB 20 through a wireless network, and a control unit which controls operations of requesting the chunk-based scheduling using the available bit rate bearer to the eNB 20 to receive the chunk constituting the traffic, and receiving, from the eNB 20, at least one chunk scheduled based on the time limit information.

In addition, the eNB 20 according to an embodiment of the present disclosure may be implemented by including a transmitting and receiving unit which transmits and receives data to and from the UE 10 through a wireless network, and a control unit which controls operations of receiving, from the UE 10, the chunk-based scheduling request using the available bit rate bearer for transmitting the chunk constituting the traffic, and scheduling the transmission of at least one chunk to be transmitted to the UE 10 based on the time limit information of the chunk.

Thus, according to the above-mentioned method and apparatus for scheduling of the present disclosure, a scheduling satisfying QoS in a congestion occurrence situation can be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of scheduling by a user equipment performed in a wireless communication system, the method comprising:
receiving information for downloading a data unit from a server providing a streaming service;
receiving, from an evolved node B (eNB), information indicating an occurrence of a congestion in the wireless communication system;
transitioning to an operation mode based on the information indicating the occurrence of the congestion;
generating scheduling information on the data unit of media data, based on the information for downloading the data unit, the scheduling information including an identifier of the data unit, and a transmission block size of the data unit;

transmitting, to the eNB, the generated scheduling information to request a scheduling based on an available bit rate bearer supporting an available bit rate; and receiving, from the eNB, the data unit through the available bit rate bearer based on the scheduling information.

2. The method of claim 1, wherein the information for downloading the data unit includes metadata related information provided for the downloading.

3. The method of claim 1, wherein the information for downloading the data unit is included in a video file transmitted through the media data.

4. The method of claim 1, wherein the available bit rate bearer is configured based on an amount of media data to be received through the available bit rate bearer and a lifetime related to an activation of the available bit rate bearer.

5. A user equipment in a wireless communication system, the user equipment comprising:

a transceiver configured to transmit and receive data to and from an evolved Node B (eNB); and a control unit coupled to the transceiver, wherein the control unit is configured to:

receive information for downloading a data unit from a server providing a streaming services, receive, from the eNB, information indicating an occurrence of a congestion in the wireless communication system, transition to an operation mode based on the information indicating the occurrence of the congestion, generate scheduling information on the data unit of media data, based on the information for downloading the data unit, the scheduling information including an identifier of the data unit, and a transmission block size of the data unit, transmit, to the eNB, the generated scheduling information to request a scheduling based on an available bit rate bearer supporting an available bit rate, and receive, from the eNB, the data unit through the available bit rate bearer based on the scheduling information.

6. The user equipment of claim 5, wherein the information for downloading the data unit includes metadata related information provided for the downloading.

7. The user equipment of claim 5, wherein the information for downloading the data unit is included in a video file transmitted through the media data.

8. The user equipment of claim 5, wherein the available bit rate bearer is configured based on an amount of media data to be received through the available bit rate bearer and a lifetime related to an activation of the available bit rate bearer.

9. A method of scheduling performed by an evolved Node B (eNB) in a wireless communication system, the method comprising:

transmitting, to a user equipment, information indicating an occurrence of a congestion in the wireless communication system;

receiving, from the user equipment, scheduling information on a data unit of media data to request a scheduling based on an available bit rate bearer supporting an available bit rate, the scheduling information including an identifier of the data unit, and a transmission block size of the data;

scheduling transmission of the data unit to be received at the user equipment within a limited time, based on the scheduling information; and transmitting, to the user equipment, the scheduled data unit through the available bit rate bearer, wherein the scheduling information is generated by the user equipment based on information for downloading the data unit from a server providing a streaming service, and wherein an operation mode of the user equipment is transitioned based on the information indicating the occurrence of the congestion.

10. The method of claim 9, further comprising:

receiving, from the user equipment, a message requesting an activation of the available bit rate bearer; and activating the available bit rate bearer based on the message.

11. The method of claim 9, wherein the limited time includes a playing time of a previous data unit being transmitted prior to the data unit.

12. The method of claim 9, wherein the available bit rate bearer is configured based on an amount of media data to be transmitted through the available bit rate bearer and a lifetime related to an activation of the available bit rate bearer.

13. An evolved Node B (eNB) in a wireless communication system, the eNB comprising:

a transceiver configured to transmit, to a user equipment, information indicating an occurrence of a congestion in the wireless communication system, and receive data from the user equipment; and a control unit coupled to the transceiver, wherein the transceiver is further configured to:

receive, from the user equipment, scheduling information on a data unit of media data to request a scheduling based on an available bit rate bearer supporting an available bit rate, the scheduling information including an identifier of the data unit, and a transmission block size of the data, schedule transmission of the data unit, to be received at the user equipment within a limited time, based on the scheduling information, and transmit, to the user equipment, the scheduled data unit through the available bit rate bearer, and wherein the scheduling information is generated by the user equipment based on information for downloading the data unit from a server providing a streaming service, and wherein an operation mode of the user equipment is transitioned based on the information indicating the occurrence of the congestion.

14. The eNB of claim 13, wherein the control unit is further configured to:

receive, from the user equipment, a message requesting an activation of the available bit rate bearer; and activate the available bit rate bearer based on the message.

15. The eNB of claim 13, wherein the limited time includes a playing time of a previous data unit being transmitted prior to the data unit.

16. The eNB of claim 13, wherein the available bit rate bearer is configured based on an amount of media data to be transmitted through the available bit rate bearer and a lifetime related to an activation of the available bit rate bearer.

* * * * *